United States Patent
Sereni et al.

(10) Patent No.: US 9,555,809 B2
(45) Date of Patent: Jan. 31, 2017

(54) TRACTOR

(71) Applicant: CNH Industrial America LLC, New Holland, PA (US)

(72) Inventors: Eugenio Sereni, Modena (IT); Rocco Petrigliano, Valsinni (IT)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 14/774,607

(22) PCT Filed: Mar. 10, 2014

(86) PCT No.: PCT/EP2014/054598
§ 371 (c)(1),
(2) Date: Sep. 10, 2015

(87) PCT Pub. No.: WO2014/139960
PCT Pub. Date: Sep. 18, 2014

(65) Prior Publication Data
US 2016/0016588 A1   Jan. 21, 2016

(30) Foreign Application Priority Data

Mar. 11, 2013   (IT) .............................. MO2013A0061

(51) Int. Cl.
*B60W 30/188*   (2012.01)
*B60W 10/06*   (2006.01)
(Continued)

(52) U.S. Cl.
CPC .......... *B60W 30/1888* (2013.01); *B60W 10/06* (2013.01); *B60W 10/10* (2013.01);
(Continued)

(58) Field of Classification Search
CPC .. B60W 30/1888; B60W 10/30; B60W 10/06; B60W 10/10; B60W 2710/0661; B60W 2710/0644; F16H 61/0213; F16H 2059/145; F16H 2059/366; F16H 2059/363
See application file for complete search history.

(56) References Cited

U.S. PATENT DOCUMENTS 4,353,272 A * 10/1982 Schneider ............. B60W 10/06
477/110
4,648,040 A * 3/1987 Cornell ................. B60W 10/06
477/69

(Continued)

FOREIGN PATENT DOCUMENTS

DE   102009026625   12/2010
EP   0698518   2/1996
WO   2011086109   7/2011

OTHER PUBLICATIONS

PCT International Search Report and Written Opinion dated Jun. 3, 2014.

*Primary Examiner* — Darlene P Condra
(74) *Attorney, Agent, or Firm* — Rickard K. DeMille; Rebecca L. Henkel

(57) ABSTRACT

A tractor is disclosed having an engine fitted with a speed governor, drive wheels, a transmission connecting the engine to the drive wheels, a controller serving to select the effective transmission ratio, and an engine driven power take-off (PTO) shaft for driving ancillary equipment connected to the tractor. When in a part load operating mode in which the PTO shaft is connected to drive an implement and the tractor is moving, the governor is set to maintain the engine working point to follow a selected speed governor line on the speed/load map of the engine. The controller is operative to initiate a change in the transmission ratio when the engine speed cannot be maintained within the specified tolerance of the desired engine speed.

4 Claims, 2 Drawing Sheets

(51) Int. Cl.
*B60W 10/10* (2012.01)
*B60W 10/30* (2006.01)
*F16H 61/02* (2006.01)
F16H 59/14 (2006.01)
F16H 59/36 (2006.01)

(52) U.S. Cl.
CPC ......... *B60W 10/30* (2013.01); *F16H 61/0213* (2013.01); *B60W 2710/0644* (2013.01); *B60W 2710/0661* (2013.01); *F16H 2059/145* (2013.01); *F16H 2059/363* (2013.01); *F16H 2059/366* (2013.01)

(56) References Cited

U.S. PATENT DOCUMENTS

| | | | | |
|---|---|---|---|---|
| 5,575,737 | A * | 11/1996 | Weiss | B60W 10/06 477/43 |
| 6,308,124 | B1 | 10/2001 | Kresse et al. | |
| 2003/0070819 | A1 * | 4/2003 | Hrazdera | A01B 61/025 172/2 |
| 2005/0211528 | A1 * | 9/2005 | Hou | B60W 30/1888 192/85.63 |
| 2008/0234102 | A1 | 9/2008 | Karlsson et al. | |
| 2009/0043459 | A1 * | 2/2009 | Harber | B62D 53/005 701/50 |
| 2009/0235627 | A1 * | 9/2009 | Silbernagel | A01D 34/006 56/10.2 G |
| 2010/0174456 | A1 * | 7/2010 | Beaudoin | B60W 10/06 701/51 |
| 2010/0301127 | A1 * | 12/2010 | Anderton | E01H 3/02 239/1 |
| 2013/0073155 | A1 * | 3/2013 | Conti | B60W 10/06 701/56 |

\* cited by examiner

TRACTOR

CROSS REFERENCE TO RELATED APPLICATIONS

This application is a national stage of PCT Application No. PCT/EP2014/054598, entitled "TRACTOR", filed on Mar. 10, 2014, which claims priority from and the benefit of Italian Patent Application Serial No. MO2013A000061, filed on Mar. 11, 2013. Each of the foregoing applications is hereby incorporated by reference in its entirety.

FIELD OF THE INVENTION

The present invention relates to a tractor having an engine fitted with a speed governor, drive wheels, a transmission connecting the engine to the drive wheels, a controller serving to select the effective transmission ratio, and a power take-off (PTO) shaft for driving ancillary equipment connected to the tractor.

BACKGROUND OF THE INVENTION

Tractors are known that have a hand operated demand lever that is used to set a minimum engine output power and a spring-biased foot pedal that can be used by the operator to increase the engine output power beyond the level set by means of the hand operated lever. Whichever of the hand lever and the foot pedal sets the higher power output level determines the governor line on the speed/load map of the engine along which the engine operates.

FIG. 1 of the accompanying drawings shows a typical speed/load map for diesel engines driving a tractor. The lines 110, 112 and 114 are three speed governor lines corresponding to three different desired engine speeds set by the hand lever and the foot pedal. When the engine is operating at part load, that is to say the operating or working point is below the maximum power curve 118, a slight decrease in load results in the working point moving from a first position (D) to a second position (E), simultaneously the engine speed rises from a desired value to a higher value while the governor reduces the amount of injected fuel to reduce output power and conversely a slight increase in load results in the working point moving from a first position (D) to a further position (F) and simultaneously the engine speed drops to a lower value while the governor increases the amount of injected fuel to increase the engine output power.

When the PTO shaft is connected to drive an implement, the conventional strategy used to control the transmission of the tractor is to maintain the engine operating near its maximum power, that is to say around point A on the maximum power curve which lies within a relatively flat region 120 of the curve 118. The total engine output power is shared between the drive wheels and the PTO. The PTO shaft always rotates at a fixed fraction of the engine speed but the loading on the PTO shaft may vary. The transmission control system acts to vary the power applied to the drive wheels, resulting in the vehicle aiming to move at the highest speed consistent with the engine operating at all times around working point A.

Because the maximum power curve is relatively flat around the point A, the engine speed can vary between the values B and C while still operating at nearly maximum efficiency. Consequently, the engine speed can vary quite significantly while still operating near is maximum output and efficiency.

PTO shafts are however intended to operate implements and ancillary equipment at preset speeds, typically one or other of 540 RPM and 1000 RPM. To achieve these speeds, the engine in the former case is required to run at a desired speed of, for instance, 1950 RPM and in the latter case at a desired speed of, for instance, 2154 RPM.

The load on the engine from the drive wheels is thus determined from the error in the engine speed and whenever the speed differs from a desired speed by a certain amount, referred to as the engine droop, a transmission ratio change is initiated.

The optimum engine droop depends on the implement that is being driven using the PTO shaft of the tractor. Some implements can tolerate considerable variation in the speed of the PTO while others are more sensitive and require tighter control over the speed of the PTO shaft. It is for this reason that some known tractors allow the operator to set the engine droop.

OBJECT OF THE INVENTION

The aim of the present invention is to allow more accurate control of the engine speed of a tractor when its PTO shaft is connected to drive an implement.

SUMMARY OF THE INVENTION

According to the present invention, there is provided a tractor having an engine fitted with a speed governor, drive wheels, a transmission connecting the engine to the drive wheels, a controller serving to select the effective transmission ratio, and an engine driven power take-off (PTO) shaft for driving ancillary equipment connected to the tractor, wherein when in a part load operating mode in which the PTO shaft is connected to drive an implement and the tractor is moving, the governor is set to maintain the engine working point to follow a selected speed governor line on the speed/load map of the engine, and wherein the controller is operative to initiate a change in the transmission ratio when the engine speed cannot be maintained within the specified tolerance of the desired engine speed.

As the PTO shaft speed is in a fixed ratio to the engine speed, in the invention, the engine speed governor is used to provide a variable, and not necessarily maximum, engine power output to maintain the engine within the specified tolerance of the desired speed while operating at the prevailing transmission ratio. The transmission ratio is changed when the operation of the speed governor alone in unable to maintain the engine speed within permissible speed range.

The invention offers greater control over engine speed when the tractor is operating in PTO mode because it is the steep governor curves 110, 112 and 114 that are used to set the engine speed, not the relatively flat region 118 of the engine maximum power curve.

Hitherto, the engine droop, that is to say the permissible variation of the engine speed, could be specified by the operator as a fraction of the desired speed (e.g. 10%, 20% or 30%). In a preferred embodiment of the invention, the droop is specified as a speed (e.g. 40 RPM, 60 RPM or 80 RPM) rather than as a fraction, such setting being more intuitive. It is still further preferred to enable the appropriate value of engine speed to be selected by the driver from a list on a display screen If the speed drops to below the set limit, the power delivered to the driving wheels is reduced by power-shifting to a lower gear ratio and conversely if it rises above the set limit, the power delivered to the driving wheels is increased by power-shifting to a higher gear ratio, at the same time increasing the ground speed of the tractor.

BRIEF DESCRIPTION OF THE DRAWINGS

The invention will now be described further, by way of example, with reference to the accompanying drawings, in which.

DETAILED DESCRIPTION OF THE EMBODIMENT(S)

Figure 2:
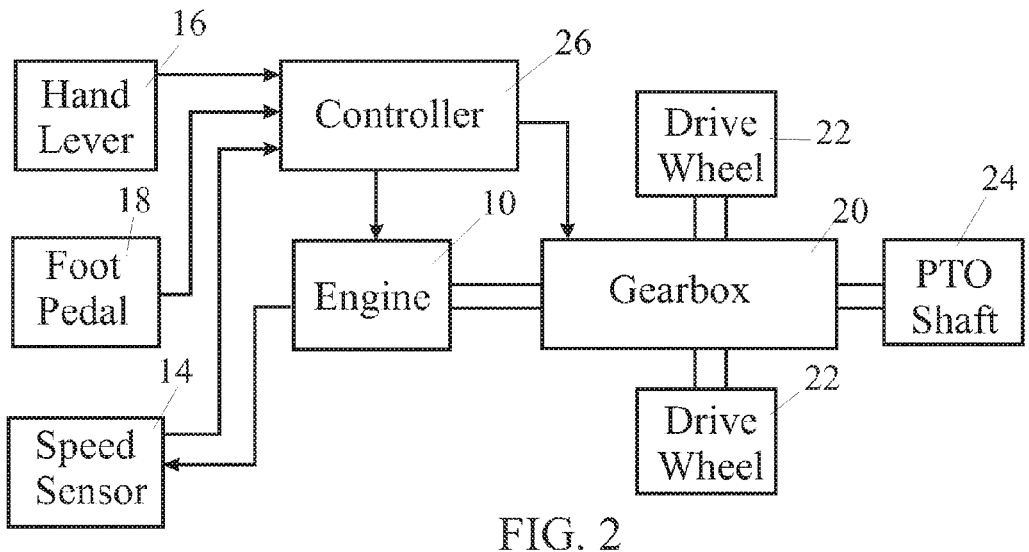
FIG. 2 is a block diagram of the drive train of a tractor capable of implementing the present invention.

In FIG. 2, there is shown a tractor drive train that comprises an engine 10 driving a gearbox 20 which in turn has output shafts supplying power to drive wheels 22 of the tractor and to a power take-off (PTO) shaft 24.

The gearbox, which may be of conventional construction, provides multiple drive ratios to the drive wheels 22. The gearbox is usually a power-shift gearbox so that there is no interruption in the supply of power to the drive wheels 222 during changes in gear ratio.

The PTO shaft 24 is driven with a fixed drive ratio so that speed at which an implement coupled to the PTO shaft is driven does not depend on the selected drive ratio but solely on the prevailing engine speed.

Implements are usually designed to be operated at one of two speeds namely 540 RPM or 1000 RPM and the splined shafts driving the different types of implement have different numbers of splines. Some tractors, designed to operate a wide range of implements, have interchangeable PTO shafts and a mechanism to allow one of two gear ratios to be pre-selected. When used to drive the PTO shaft at a desired speed, a coupling shaft with the desired number of splines is mounted on the gearbox, the appropriate PTO shaft drive ratio is selected and the engine is then set to operate at the appropriate speed, which is for instance 1950 RPM when driving the PTO shaft at 540 RPM and 2154 RPM when driving the PTO shaft at 1000 RPM.

As with all diesel engines, a governor, as part of controller 26 is provided to maintain the engine running at a desired speed despite variation, within certain limits, of the load on the engine. In particular, the governor compares the prevailing speed of the engine 10, as determined by a speed sensor 14, with the desired engine speed, set by the operator using a hand lever 16 and a foot pedal 18 and determines the quantity of fuel that should be injected into the engine to achieve the desired engine speed. The steep governor lines 110, 112 and 114, given by way of example in FIG. 1, represent how the engine output power is varied by modifying the fuel injection quantity in response to a detected engine speed error, that is to say a detected difference between the desired and actual engine speed.

Figure 1:
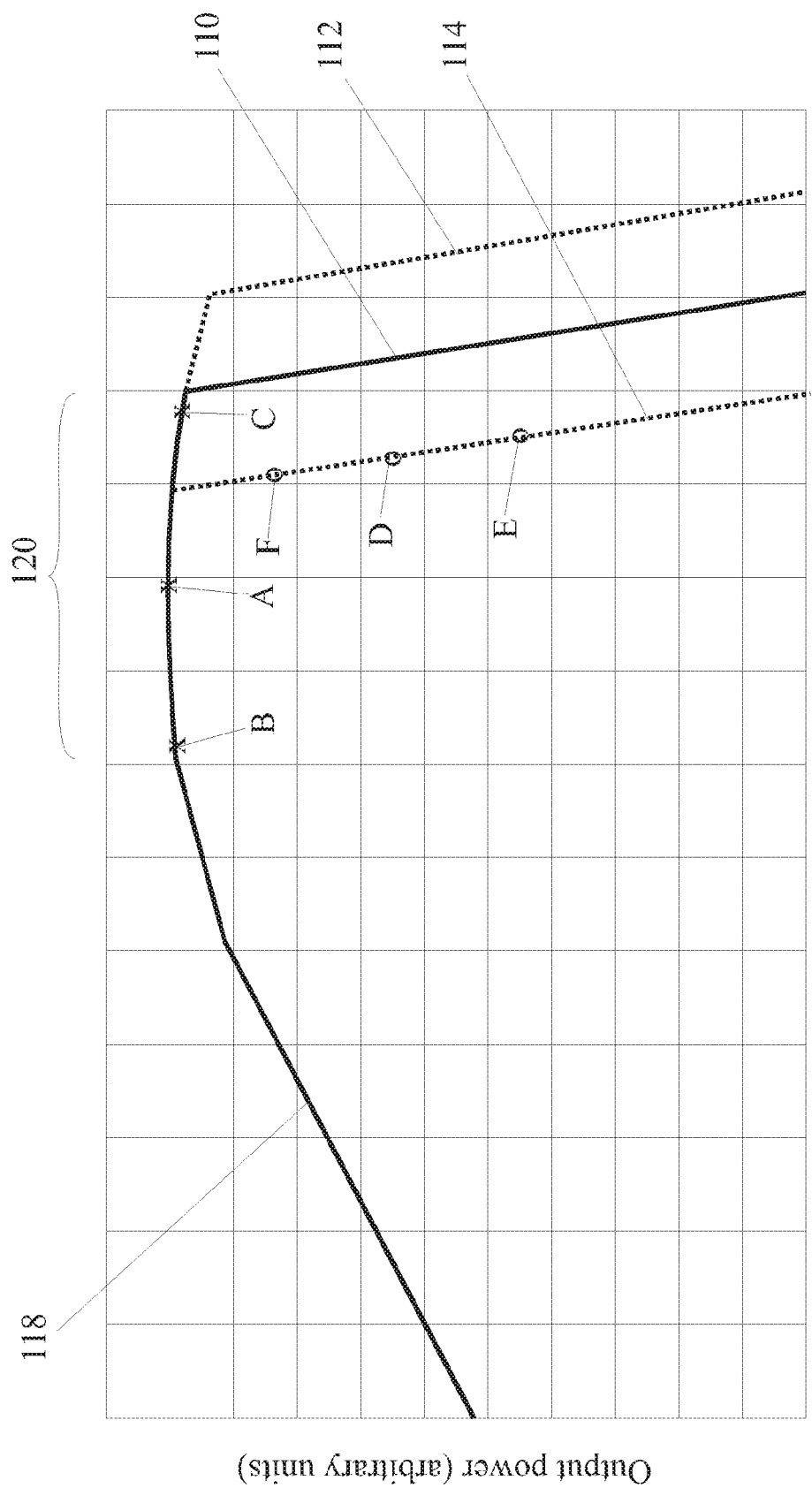
FIG. 1, as described previously, shows a typical power curve for a diesel engine.

As will be clear from the governor lines 110, 112 and 114 in FIG. 1, the governor can only maintain the engine speed at the desired value while the load on the engine lies within a restricted range. In particular, once a governor line reaches a knee point where a governor line 110, 112 or 114 intersects the maximum power output curve 118 in FIG. 1, increasing the injected fuel quantity does not produce any further increase in engine power. When this situation is reached it is necessary to reduce or increase the load on the engine and this is achieved by changing the gear ratio of the drive wheels.

The various blocks in FIG. 2 are present both in a conventional tractor and in a tractor for implementing the present invention. The difference lies in the control strategy adopted by the controller 26 which is used to select the transmission ratio of the gearbox.

Conventionally, when operating a tractor with an implement connected to the PTO shaft, the quantity of fuel injected into the engine cylinders is set to a maximum and the governor plays no part in the control of the engine. Instead, the engine is operated on the maximum power curve 118 near working point A in FIG. 1, corresponding to maximum power. Because of the fact that the curve 18 is relatively flat in the range between the points B and C small changes in load can correspond to significant changes in engine speed.

By contrast, in the preferred embodiment of the invention, the engine is, when possible, operated under part load conditions and the governor is relied upon for the working point to follow the governor line. Only when the engine speed is outside the tolerance from the desired engine speed does the controller initiate a change in gear ratio.

Referring to FIG. 2, in an embodiment of the invention, the operator starts by setting the speed at which the engine should run in order for the PTO shaft to run at the desired speed. Furthermore, the controller 26 receives instructions using a button on a control panel to set an engine droop appropriate to the implement connected to the PTO shaft. The value of the appropriate engine droop may be selected from a list or input through a display. As an alternative, the controller 26 may receive a signal over a bus directly from the implement to set the appropriate engine droop with operator intervention. If set by the operator, the droop is preferable set in RPM rather than as a percentage of engine speed.

If the tractor is at a standstill, the governor which forms part of the controller 26 will control the fuel delivery to the engine to maintain the desired engine speed. Owing to the steepness of the governor lines 110,112,114, which is set by the software, the engine speed can be maintained within narrow limits as the implement load varies.

When the tractor is set in drive mode by the operator, the engine output power is split between the PTO shaft and the drive wheels. While still operating at part load, for example working point D in FIG. 1, the governor will now inject sufficient fuel to provide the additional power consumed by the drive wheels. When the working point moves up or down the governor line, the desired engine droop will be exceeded and at that point the controller 26 will initiate a gear change to reduce or increase the amount of power consumed by the drive wheels.

Figure 3:
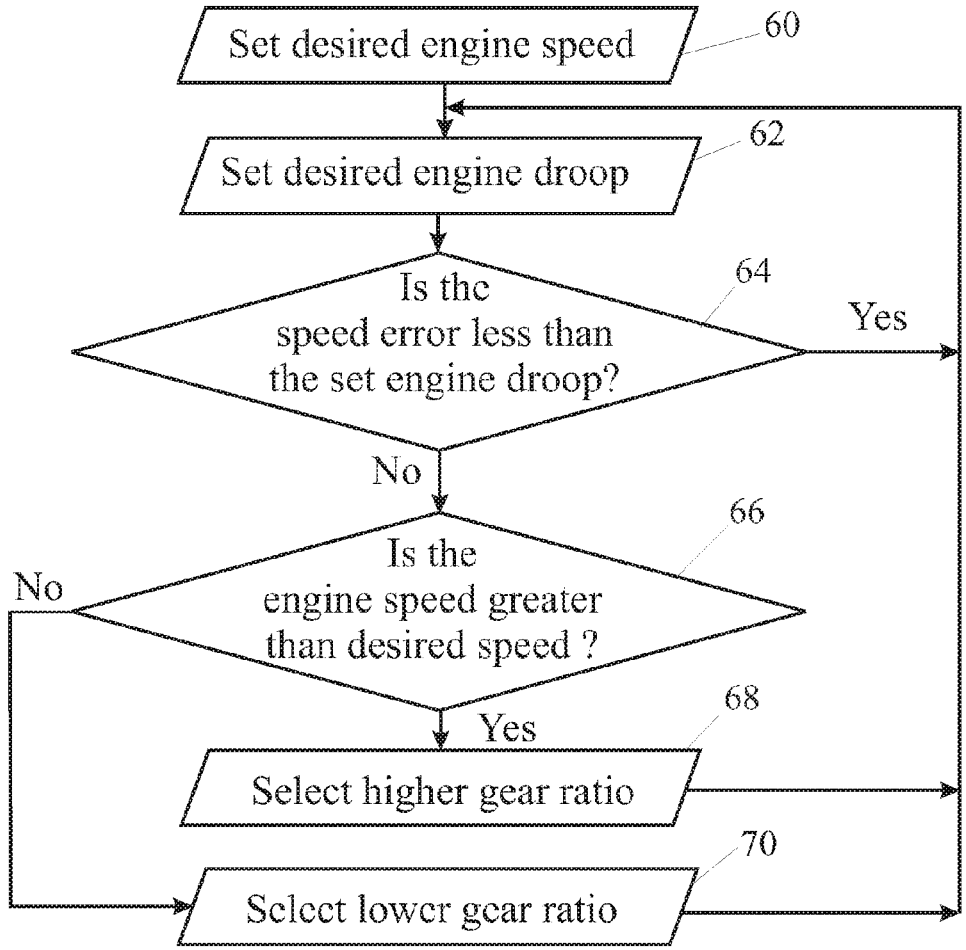
FIG. 3 is a flow chart that explains the control strategy used by the controller in FIG. 2.

FIG. 3, further explains the control strategy implemented by the controller 26. In step 60 the operator sets the desired engine speed which as earlier explained is either 1950 RPM or 2154 RPM. In step 62, the desired droop is set either manually by the operator or by a signal received from the implement drive by the PTO shaft. The controller then issues a command to the governor to maintain a desired engine speed. For as long as the combined power loading from the wheels and the implement is within a certain range the engine speed will remain with the set limits. Thus, in decision box 64, for as long as the speed error, that is to say the difference between the desired and actual engine speeds, is less than the set engine droop, no action will be taken and the chart will return to step 62 where the engine droop can be reset if required.

If on the other hand the governor is unable to cope, then the engine speed error will exceed the set droop and action will need to be taken by the controller 26. In block 66, it is determined if the current engine speed is higher or lower than the desired engine speed. If higher, then in step 68 a higher gear ratio will be selected thereby increasing the power consumed by the drive wheels 22 and consequently reducing the engine speed. Conversely, if the actual engine speed is lower than the desired engine speed then in step 70 a lower gear ratio will be selected thereby decreasing the power consumed by the drive wheels 22 and consequently increasing the engine speed.

The invention claimed is:

1. A tractor having an engine fitted with a speed governor, drive wheels, a transmission connecting the engine to the drive wheels, a controller serving to select a transmission ratio, and an engine driven power take-off (PTO) shaft configured to drive ancillary equipment connected to the tractor, wherein when in a part load operating mode in which the PTO shaft is connected to drive an implement and the tractor is moving, the speed governor is set to maintain an engine working point to follow a selected speed governor line on a speed/load map of the engine;

wherein the controller is operative to initiate a change in the transmission ratio when a speed of the engine cannot be maintained within a tolerance of a desired engine speed.

2. The tractor of claim 1, wherein a control is provided to enable an operator to specify the tolerance of the desired engine speed in revolutions per minute.

3. The tractor of claim 2, wherein the tolerance of the desired engine speed is selectable by the operator from a list on a display screen.

4. The tractor of claim 1, wherein the controller is operative to receive a signal directly from an implement connected to the PTO shaft of the tractor indicative of the tolerance of the desired engine speed.

\* \* \* \* \*